United States Patent [19]
Cadotte et al.

[11] Patent Number: 4,960,518
[45] Date of Patent: Oct. 2, 1990

[54] TREATMENT OF COMPOSITE POLYAMIDE MEMBRANES WITH COMPATIBLE OXIDANTS

[75] Inventors: John E. Cadotte, Minnetonka; Joel R. Racchini, St. Louis Park, both of Minn.

[73] Assignee: The FilmTec Corporation, Minneapolis, Minn.

[21] Appl. No.: 450,691

[22] Filed: Dec. 13, 1989

[51] Int. Cl.$^5$ ............................................. B01D 61/02
[52] U.S. Cl. .................................... 210/639; 210/651; 210/652; 210/500.38
[58] Field of Search ............... 210/634, 638, 639, 644, 210/649, 650–654, 500.1, 500.21, 500.23, 500.27, 500.37, 500.38

[56] References Cited

U.S. PATENT DOCUMENTS 4,814,399  3/1989  Sansune et al. ...................... 525/435

Primary Examiner—Frank Sever

[57] ABSTRACT

A reverse osmosis membrane having improved rejection of sulfuric acid and/or isopropanol is described. The membrane is prepared by treating a crosslinked, polyamide discriminating layer with a compatible oxidizing reagent, such as peracetic acid, periodic acid or chloramine, whereby the passage through the treated membrane of sulfuric acid in a 2 percent aqueous solution at a transmembrane pressure of 400 psi is reduced by at least 30 percent.

22 Claims, No Drawings

TREATMENT OF COMPOSITE POLYAMIDE MEMBRANES WITH COMPATIBLE OXIDANTS

BACKGROUND OF THE INVENTION

This invention relates to treatment of composite polyamide reverse osmosis membranes. More specifically, treatment of polyamide membranes to enhance rejection of certain acids and organic materials in a reverse osmosis process is contemplated.

Removal of materials dissolved or dispersed in a solution by separation of these materials from the dispersing medium or solvent utilizing reverse osmosis membranes is well known. The membranes used for reverse osmosis are selectively permeable to certain components of the mixture to be separated. Generally, water is the component to which such membranes are especially permeable. An aqueous feed solution is conveniently brought in contact with one surface of the reverse osmosis membrane under pressure so as to effect selective permeation of water through the membrane. This process is most generally used for desalination of water-containing salts. However, reverse osmosis has also been used to separate organic compounds and other materials from aqueous feed solutions.

The performance of reverse osmosis membranes has a critical effect on the efficiency and efficacy of reverse osmosis processes. Advantageously, the reverse osmosis membrane should be relatively impermeable to materials which are to be separated from the water and highly permeable to water. It has been found that membranes having a porous support which provides physical strength but imparts little or no rejection, combined with a thin dsscriminating layer adherent to the support, are particularly useful. Such membranes are commonly referred to as thin film composite membranes.

Polyamide membranes have been widely employed in reverse osmosis processes. U.S. Pat. No. 4,277,344 describes a variety of membranes having a polyamide discriminating layer on a porous support. These membranes are preferably prepared by interfacial polymerization of a difunctional aromatic amine such as metaphenylene diamine and a trifunctional aromatic acyl halide, such as trimesoyl chloride, optionally containing difunctional acyl halide. A 1,3,5-cyclohexane tricarbonyl chloride can also be employed as the acyl halide reactant. Such membranes are further illustrated in U.S. Pat. Nos. 4,520,044 and 4,606,943. European Patent Application Publication No. 211,633 also describes composite polyamide membranes.

The treatment of membranes to enhance performance is described in the prior art in a number of patents. U.S. Pat. No. 3,551,331 describes a process for modifying the permeability of a substantially linear aliphatic polyamide membrane. In this process, the polyamide membrane is treated with a protonic acid, lyotropic salt or a Lewis acid.

U.S. Pat. No. 3,877,978 describes use of copolymers of vinyl acetate with various ethylenically unsaturated carboxylic acids to enhance the rejection of certain semi-permeable membranes.

U.S. Pat. No. 3,886,066 discloses the use of hydrolyzable tannins to reduce the salt passage through semipermeable membranes.

U.S. Pat. No. 3,951,815 describes a composite semi-permeable membrane formed of an ultrathin film of polyethylenimine on a support, where said film has been crosslinked with difunctional or trifunctional acylhalides, chloroformates, isocyanates and sulfonyl chlorides.

U.S. Pat. No. 4,214,020 describes a process for coating exteriors of hollow fiber membranes to enhance their membrane characteristics.

U.S. Pat. No. 4,634,531 describes the use of sequential treatment with a water-soluble amine and a water-soluble aldehyde to improve selective permeation.

U.S. Pat. No. 4,704,324 teaches preparation of membranes by reaction of a nucleophilic first compound with a second compound bearing reactive onium groups.

U.S. Pat. No. 4,812,238 describes the treatment of composite polyamide membranes with nitrous acid or a diazonium compound. The nitrous acid is disclosed to react with pendant amine groups.

U.S. Pat. No. 4,828,700 discloses that reverse osmosis membranes can be treated with polymers bearing carboxylic acid groups and optionally pendant hydroxyl or amide moieties to enhance salt rejection.

U.S. Pat. No. 3,904,519 describes treatment of linear aromatic polyamides with certain crosslinking reagents to improve flux or flux stability of the resulting membranes. Crosslinking reagents employed include aldehydes, polyamines, polycarboxylic acids, polyisocyanates, oxidizing agents, peroxides and other compounds.

Existing commercial composite polyamide membranes display a good combination of high water flux, good salt rejection and acceptable chemical stability. Membranes which are more tolerant of acidic or basic conditions and which demonstrate a higher rejection for organic materials while maintaining high water flux are still sought.

SUMMARY OF THE INVENTION

A method of treating a clean, composite, crosslinked polyamide reverse osmosis membrane to enhance rejection of certain organic compounds and sulfuric acid has now been discovered. This method comprises contacting a composite membrane having a clean, crosslinked polyamide discriminating layer with a solution of an effective amount of a compatible oxidizing reagent, whereby the passage through the membrane of sulfuric acid in a two percent aqueous solution at 400 psig and 25° C. is reduced by at least 30 percent, more preferably 50 percent, relative to the membrane prior to treatment and the water flux of said membrane is reduced by not more than 50 percent, preferably not more than 40 percent, after treatment.

In another aspect, the invention is a composite crosslinked polyamide membrane which has been treated by the method described hereinbefore. This membrane possesses novel properties in its combination of high sulfuric acid rejection, high rejection of isopropyl alcohol and certain other organic compounds and excellent water flux. Surprisingly, it has been found that such treated membranes exhibit higher rejection for selected solutes than the untreated membrane with minimum loss of flux in separation of water from aqueous sulfuric acid or aqueous organic streams.

DETAILED DESCRIPTION OF THE INVENTION

Composite reverse osmosis membranes having cross-linked polyamide discriminating layers are well-known. The discriminating layer is advantageously derived from reactants comprising: (a) a compound or polymer bearing at least two primary amine groups and (b) a compound or polymer bearing an average of more than two carboxylic acyl halide groups. The amine and acid halide reactants may be aliphatic, cycloaliphatic or aromatic. Aromatic amines, that is compounds wherein one or more amine groups are bonded to a carbon atom in an aromatic ring, are especially preferred. The amine compound may contain one or two fused or separate aromatic rings in preferred embodiments.

The carboxylic acid halide reactant employed to prepare the polyamide discriminating layer desirably includes an aromatic acyl halide bearing at least three acyl halide groups. The carboxylic acid halide reactant may comprise some compounds or polymers which are difunctional. Preferably, at least 50 mole percent of the carboxylic acid halide reactant is trifunctional or more highly functionalized. The compound bearing the two acyl halide groups optionally bear other substituents which do not interfere with the reaction forming the membrane. Preferably, the carboxylic acid halide is trimesoyl halide. Advantageously, the carboxylic acid halide reactant is trimesoyl halide or cyclohexane-1,3,5-tricarbonyl halide or mixtures of these trifunctional acyl halides. Optionally, isophthaloyl halide and/or terephthaloyl halide may be employed with one or both of the trifunctional acyl halides. The halide is preferably chloride, but may be bromide.

The aromatic amine compound optionally may bear other substituents which do not interfere with the membrane formation reaction. For example, a compound bearing two primary amine groups and one group which has a carbonyl function not adjacent to the amine group, as described in U.S. Pat. No. 4,761,234, may be employed but is not preferred. The preferred amine reactant employed to form the membrane is phenylene diamine, more preferably meta-phenylene diamine.

The composite crosslinked polyamide membrane can be prepared by techniques known in the prior art. Conveniently, interfacial polymerization of an aqueous amine applied to a microporous substrate with an acyl halide in an organic solution, such as described in U.S. Pat. No. 4,277,344, can be employed and is incorporated herein by reference. Preferred as an organic solvent is an aliphatic hydrocarbon such as hexane, or a chlorofluorocarbon, such as 1,1,2-trichlorotrifluoroethane. Other similar techniques for preparing such membranes are described in U.S. Pat. Nos. 4,606,943; 4,520,044; 4,761,234; 4,772,394; and 4,828,700, and are incorporated herein by reference.

The microporous substrate on which these composite membranes are formed can be any substrate conveniently employed for this purpose. Suitable substrates for composite membranes have been extensively described in the prior art. Illustrative support materials include organic polymeric material such as polysulfone, polyether sulfone, chlorinated polyvinylchloride, styrene/acrylonitrile copolymer, polybutylene terephthalate, cellulose esters and other polymers which can be prepared with a high degree of porosity and controlled pore size distribution. Porous inorganic material may also be operable as supports. Preferably, the surface pores in the support material will have a diameter 2000 Å or less, and the support material will have as high a porosity as is possible, while maintaining the desired pore size, integrity, and strength. Especially preferred as support layers are porous polysulfone films. These films are generally cast on non-woven fabric or woven cloth in the manner described in U.S. Pat. No. 4,277,344. Surface active agents may be employed in the aqueous amine solution to enhance wetting of a hydrophobic substrate.

Especially preferred as membranes to be treated by the method described herein are the membranes disclosed in U.S. Pat. No. 4,277,344. In preferred embodiments, these membranes are prepared by interfacial polymerization of meta-phenylene diamine and trimesoyl chloride. Such membranes are sold by FilmTec Corporation under the designation FT30 membranes.

In one embodiment of the invention, the membrane may be derived from amine reactants or acyl halide reactants which are polymeric. For example, a polymer made by reaction of a difunctional aromatic amine with trimellitic anhydride acid halide optionally mixed with trimesoyl halide, as described in U.S. Pat. No. 4,606,943, is operable as the amine reactant, but is not preferred.

The polyamide of the membrane discriminating layer is crosslinked. These polyamides preferably have a crosslink density of at least about 10 crosslinks, more preferably at least about 50 crosslinks, per 100,000 molecular weight. The crosslink density can be determined by standard end-group analysis techniques and may be estimated by the insolubility or swelling of the resulting polyamide in solvents in which linear polyamides are soluble.

The rejection by the polyamide reverse osmosis membrane of specific solutes and the water flux of the membrane prior to treatment can operably vary over a wide range. The flux and rejection of specific solutes is determined with reference to test conditions using a specific concentration of solutes at a specific pressure and temperature. Preferably, the membrane to be treated will have a sodium chloride rejection of at least about 90 percent, more preferably 95 percent, and a water flux of at least about 12 gallons per square foot per day (gfd), more preferably at least about 15 gfd, when tested using an aqueous 0.2 weight percent sodium chloride solution at a transmembrane pressure of 200 lbs./sq. inch (psi) at 25° C. Membranes having a higher salt rejection and useful with seawater feed at a pressure of 800 psi at 25° C. with a flux of 10 gfd may also be treated. Membranes having a much higher flux and lower salt rejection prepared as described in U.S. Pat. No. 4,765,897, which is incorporated by reference, can also be employed.

The membrane may be in the form of a flat sheet, tubular or hollow fiber configuration. The membrane can be treated either prior to or after assembly into an element. In one especially preferred embodiment, the membrane is fabricated into a spiral membrane device and then treated by the method of this invention to produce a membrane element having enhanced rejection of both sulfuric acid and certain organic compounds.

It is found that the membranes to be treated by the method of this invention are desirably clean. In this context a "clean" membrane is a membrane which has not been subject to extensive service wherein the membrane flux or performance has been reduced by fouling. It has been found that membranes which are freshly prepared and have been subjected to only a brief test, (preferably less than 24 hours, more preferably less than 1 hour) to determine initial reverse osmosis performance or no test prior to treatment are particularly suitable to the treatments of this invention. Membranes which have been in service for an extended time and then are cleaned by standard techniques after being fouled are not as susceptible to treatment by the method of this invention.

The reagent employed in treating the composite crosslinked polyamide membrane modifies the membrane at the conditions employed for treatment in a way which is not fully understood. This reaction is an oxidation, but treatment with strong oxidizing reagents or high concentrations of oxidizing reagents for extended periods do not as conveniently provide the desired modification. This compatible oxidizing reagent may be selected from the group consisting of a peroxycarboxylic acid, periodic acid, N-chloroamine compounds and N-bromoamine. The reagent is preferably selected from the group consisting of peracetic acid, periodic acid, or chloramine. Other oxidizing reagents may be employed, but these reagents must be compatible, i.e., not deleteriously affect the membrane properties.

The term "compatible oxidizing reagent" as used herein refers to oxidizing agents which do not deleteriously affect the properties of the composite membrane when employed for a short time period. Preferably, the compatible oxidant has a molecular weight less than about 300, more preferably less than about 150. Such compatible oxidizing reagents do not include strong oxidants, such as sodium hypochlorite, the use of which is suggested in U.S. Pat. No. 4,277,344. However, it should be noted that treatment with sodium hypochlorite has been found in some instances to enhance sulfuric acid rejection of composite polyamide membranes.

The oxidizing reagents employed herein are believed to oxidize pendant amine groups remaining in the desalinizing layer to convert such groups to groups which are less basic. The present invention is not limited by any specific theory as to how the subject reagents enhance rejection of certain materials by the subject membranes.

The reagent preferably contacts the discriminating layer of the composite crosslinked polyamide membrane while in a liquid diluent. Preferably, this diluent does not deleteriously affect either the discriminating layer or the support layer of the composite membrane. Advantageously, the oxidizing reagent is dissolved in the diluent. The suitability of a diluent will depend upon the specific composition of the desalinizing layer, the nature of the oxidizing reagent and the composition of the support. An effective amount of the reagent is employed to impart the desired rejection properties to the membrane after treatment without deleterious affects on the membrane. An aqueous solution of from 0.1 to about 1 percent of the oxidizing reagent is generally preferred. Diluents other than water may be preferred if water will react with the reagent. Co-solvents can be employed with water but are generally not necessary nor desirable. Suitable co-solvents include the lower alkanols, such as isopropanol or ethanol, and amides, such as N,N-dimethylformamide.

The time required for the desired properties to be imparted to the membrane will vary dependent on the nature of the desalinizing layer, the identity of the oxidizing reagent, temperature, concentration of the reagent, and other factors. Preferably, the oxidizing reagent in water or other diluent should flow continuously over the membrane surface during treatment to replenish the reagent in contact with the surface. Typically, contact times in the range of 0.5 hour to 72 hours or more are desirable. The longer contact times are believed to be required with reagents of higher molecular weight, which will penetrate the desalinizing layer of the membrane slowly. For this reason, the reagent employed is most preferably monomeric or substantially monomeric and has a molecular weight of less than about 100.

The temperature during treatment of the membrane is desirably maintained so as to avoid deleterious effects on the membrane. Too high a temperature may reduce flux and/or salt rejection by the membrane while too low a temperature may lead to undesirably long contact times for the treatment. Generally, temperatures in the range from about 15° to about 50° C., preferably about 20° to about 35°, are advantageous.

The treatment is conveniently conducted at atmospheric pressure, but a positive transmembrane pressure differential can optionally be employed.

The treatment of composite, crosslinked polyamide reverse osmosis membranes described herein can enhance the rejection of specific compounds by such membranes. In particular, the rejection of sulfuric acid, sodium hydroxide, sodium nitrate and various organic compounds, such as isopropanol, can be affected by these treatments. Moreover, the rejection of common salts, such as sodium chloride, may also be enhanced by these treatments. Not all rejections of all compounds are necessarily affected to the same degree by various treatments. Sulfuric acid rejection can frequently be employed to indicate whether or not the treatment has in fact affected rejection of the membrane. Advantageously, the aqueous feed solution contains less than about 4 weight percent sulfuric acid, so as to avoid deleterious effects and excessive osmotic pressure. However, it is desirable to evaluate any membrane with the particular stream with which said membrane will be employed in order to determine the effectiveness of this treatment in enhancing rejection of specific solutes.

The following examples are presented to illustrate the invention, but are not otherwise intended to limit the subject invention. All parts and percentages are by weight unless otherwise indicated. Passage of a solute is in percent and is calculated by subtracting the rejection of said solute in percent from 100. Water flux is reported in gallons per square foot (of membrane) per day (gfd). The concentration of the solute in the feed water is specified, as is the pressure of the feed during evaluation of the membrane performance. The temperature of the feed water during these reverse osmosis tests is ambient, generally about 18° to 25° C., and flux data were then normalized to 25° C. using standard tables available for commercial membranes of the type treated.

The membrane used in the examples is generally a composite crosslinked polyamide membrane having a polysulfone support and a desalinizing layer prepared by the interfacial polymerization of meta-phenylene diamine in an aqueous medium with trimesoyl chloride in an organic medium and is prepared in accordance with U.S. Pat. No. 4,277,344. This membrane is available from FilmTec Corporation under the designation FT30 membrane. If the membrane is dried, it is desirable to treat with a surface active agent prior to drying to make the membrane more readily wettable.

EXAMPLE 1

A commercially available FT30 membrane is evaluated in Comparative Experiment 1 employing a 0.2 percent aqueous sodium chloride solution at 200 psi, a sulfuric acid solution of pH 1 at 400 psi and a sodium hydroxide solution of pH 12 at 200 psi in three sequential reverse osmosis tests. A sample of the same membrane as that used in Comparative Experiment 1 is then treated with 1 percent peracetic in an aqueous solvent for 24 hours at about 25° C. in Example 1. The treated membrane is then tested sequentially with sodium chloride, sulfuric acid, and sodium hydroxide feed streams like those used in Comparative Experiment 1 and the results are tabulated in Table I.

streams as Comparative Experiment 3 and the results of these evaluations are tabulated in Table II.

A FT30 membrane in Comparative Experiment 5 is treated with 1 percent hydrogen peroxide plus 2 percent sulfuric acid in an aqueous solution at about 25° C. for 20 hours. The treated membrane is then evaluated with aqueous feed streams of various solutes and their results are tabulated in Table II.

TABLE I

| | | | RO Tests | | | | | |
|---|---|---|---|---|---|---|---|---|
| | | | 0.2% NaCl at 200 psi | | $H_2SO_4$ (pH 1) at 400 psi | | NaOH (pH 12) at 200 psi | |
| Comparative Experiment | Example | Treatment | Flux | Solute Passage | Flux | Solute Passage | Flux | Solute Passage |
| 1 | — | Control | 33 | 4.3 | 33 | 14 | 35 | 15 |
| — | 1 | 1% Peracetic acid | 27 | 1.2 | 20 | 1 | 25 | 4.9 |
| 2 | — | Lab formed FT-30 control | 14 | 0.8 | 24 | 7 | 21 | 4.8 |

In Comparative Experiment 2, a membrane is formed by immersing by hand a polysulfone microporous support in aqueous meta-phenylene diamine and then treating said support with trimesoyl chloride in a 1,1,2-trichlorotrifluoroethane solvent at about 25° C. The resulting laboratory-produced membrane was evaluated in reverse osmosis test as tabulated in Table I. The lab-prepared membrane without any treatment displays lower flux and lower solute passage than the commercially available membrane in Comparative Experiment 1, but sulfuric acid passage remains high. The treatment in Example 1 attains lower solute passage for sulfuric acid and sodium hydroxide than the membrane from which it was prepared. The peracetic acid treatment appears to have little effect on water flux. The peracetic acid significantly reduces solute passage of all the feed streams evaluated.

EXAMPLES 2-3

A control sample of a commercially available composite polyamide membrane sold under the tradename FT30 is evaluated in Comparative Experiment 3 with three separate feed streams in a manner similar to Comparative Experiment 1. The three feed streams are 0.2 percent aqueous sodium chloride at 200 psi, sulfuric acid at pH 1 at 400 psi and sodium hydroxide at pH 12, all at 200 psi.

In Comparative Experiment 4, a sample of FT30 membrane is treated with 1 percent aqueous hydrogen peroxide at a pH of 7 for 20 hours at 25° C. The treated membrane is then evaluated with the same three feed In Comparative Experiment 6, a sample of FT30 membrane is treated with an aqueous solution of 1 percent hydrogen peroxide and 1 percent acetic acid for 20 hours at about 25° C. The treated membrane is then evaluated in reverse osmosis tests and the results of these tests are tabulated in Table II.

A sample of FT30 membrane is treated with an aqueous solution of 1 percent hydrogen peroxide and 0.1 percent sodium hydroxide at a pH of 9 for a period of 20 hours at about 25° C. The treated membrane is evaluated in reverse osmosis tests and results are reported in Table II as Comparative Experiment 7.

A sample of FT30 membrane is treated for 1 hour at about 25° C. with an aqueous solution of 1 percent peracetic acid, at a pH of 1.5. The resulting treated membrane was evaluated in reverse osmosis tests and the results of these tests are shown in Table II as Example 2.

A sample of FT30 membrane is treated with an aqueous solution of 1 percent peracetic acid for 24 hours at about 25° C. This membrane is evaluated in reverse osmosis tests and the results of these tests are reported in Table II as Example 3.

In Comparative Experiment 8 another sample of FT30 membrane is evaluated in reverse osmosis tests and the results of these tests are shown in Table II. A sample of membrane like that employed in Comparative Experiment 9 is then treated with 100 parts per million of sodium hypochlorite for 24 hours at about 25° C. The treated membrane is then evaluated in a series of reverse osmosis tests and results of these test are tabulated in Table II as Comparative Experiment 9.

TABLE II

| | | | RO Tests | | | | | |
|---|---|---|---|---|---|---|---|---|
| | | | 0.2% NaCl at 200 psi | | $H_2SO_4$ at 400 psi | | NaOH at 200 psi | |
| Comparative Experiment | Example | Treatment | Flux | Sol. Passage | Flux | Sol. Passage | Flux | Sol. Passage |
| 3 | — | Control | 29 | 4.9 | 34 | 16 | 28 | 27 |
| 4 | — | 1% $H_2O_2$ (neutral pH) | 25 | 4.4 | 33 | 12 | 28 | 24 |
| 5 | — | 1% $H_2O_2$ + 2% $H_2SO_4$ | 28 | 5.6 | 33 | 17 | 27 | 29 |
| 6 | — | 1% $H_2O_2$ + 1% acetic acid | 30 | 6 | 32 | 16 | 27 | 27 |
| 7 | — | 1% $H_2O_2$ + 0.1% NaOH (pH 9) | 32 | 4.4 | 36 | 18 | 36 | 11 |
| — | 2 | 1% peracetic acid (pH 1.5) (1 hour) | 24 | 5.0 | 23 | 3.7 | 25 | 6.3 |
| — | 3 | 1% peracetic acid (24 hour) | 23 | 2.8 | 22 | 2.1 | 24 | 4.6 |

TABLE II-continued

| Comparative Experiment | Example | Treatment | RO Tests | | | | | |
|---|---|---|---|---|---|---|---|---|
| | | | 0.2% NaCl at 200 psi | | $H_2SO_4$ at 400 psi | | NaOH at 200 psi | |
| | | | Flux | Sol. Passage | Flux | Sol. Passage | Flux | Sol. Passage |
| 8 | — | Control | 21 | 9.3 | 27 | 18 | 24 | 21 |
| 9 | — | 100 ppm NaOCl, 14 hours | 27 | 3.4 | 25 | 1.2 | 62 | 45 |

From the data in Table II it is apparent that peracetic acid significantly increased the rejection of the membrane for all solutes evaluated with little impact on the flux of said membrane. The membrane samples treated with hydrogen peroxide at various pH's showed little decrease in sulfuric acid passage.

The membrane treated with sodium hypochlorite showed enhanced water flux and salt rejection as is taught in U.S. Pat. No. 4,277,344. The sulfuric acid rejection of the membrane was increased with minimal decrease in flux. However, the sodium hypochlorite treatment in combination with sodium hydroxide testing results in a membrane with a very high flux and a very high solute passage.

EXAMPLES 4-6

Two samples of a commercial FT30 membrane are tested to determine the water-flux and solute passage with four different feed streams in Comparative Experiment 10. The feed streams include 0.2 percent sodium chloride. 0.2 percent sodium nitrate, sulfuric acid at a pH of 1 and sodium hydroxide at a pH of 12. All tests, except the sulfuric acid, are conducted at 200 psi. The sulfuric acid test is conducted at 400 psi. Samples of membrane like those evaluated in Comparative Experiment 10 are treated with 0.1 percent aqueous peracetic acid in Example 4, with 0.1 percent aqueous periodic acid in Example 5 and with 1,000 parts per million chloramine in Example 6. All the treatment solutions are aqueous solutions and the treatments are for a period of three days at a temperature in the range of about 25° C.

The treated membranes were then evaluated in reverse osmosis tests and the results are tabulated in Table III.

TABLE III

| Comparative Experiment | Example | Treatment | RO Tests | | | | | | | |
|---|---|---|---|---|---|---|---|---|---|---|
| | | | 0.2% NaCl at 200 psi | | 0.2% $NaNO_3$ at 200 psi | | $H_2SO_4$, pH 1 at 400 psi | | NaOH, pH 12 at 200 psi | |
| | | | Flux | Solute Passage | Flux | Solute Passage | Flux | Solute Passage | Flux | Solute Passage |
| 10 | — | Control | 17 | 12.3 | 21 | 16.1 | 21 | 13.5 | 18 | 17 |
| | | | 16 | 8.2 | 20 | 7.2 | 20 | 13.8 | 17 | 16 |
| — | 4 | 0.1% Peracetic Acid | 14 | 4.2 | 18 | 7.4 | 19 | 1.9 | 17 | 8 |
| | | | 15 | 4.6 | 19 | 8.2 | 20 | 2.2 | 18 | 8 |
| | 5 | 0.1% Periodic Acid | 33 | 5.4 | 34 | 10.1 | 43 | 2.9 | 53 | 23 |
| | | | 33 | 5.1 | 34 | 10.6 | 42 | 2.5 | 53 | 23 |
| | 6 | 1000 ppm Chloramine | 34 | 10.1 | 36 | 11.5 | 43 | 5.4 | 40 | 13 |
| | | | 34 | 10.6 | — | 15.1 | 42 | 6.8 | 39 | 14 |

The peracetic acid treated membranes generally show the lowest solute passage with all of the solutes after treatment. The periodic acid treatment shows generally higher fluxes then the membrane prior to treatment and reduced solute passage for sulfuric acid and sodium chloride. The solute passage of sodium nitrate after the periodic acid treatment was lower than the FT30 control membrane but higher than the peracetic acid-treated membrane. The periodic acid treated membrane showed very high flux and poor solute passage in testing with sodium hydroxide. The chloramine-treated membrane also showed higher fluxes than the control, but the solute passages were generally comparable after chloramine treatment to that of the membrane prior to the treatment with the exception of the sulfuric acid solute passage which was reduced by more than 50 percent.

EXAMPLES 7-9

In Comparative Experiment 11 a FT30 membrane is evaluated in reverse osmosis tests with four solutions in a manner similar to Comparative Experiment 10. Two samples of the membrane are then treated with either peracetic acid, periodic acid, or chloramine in the general manner of Examples 4, 5 or 6, respectively, except that the treatment was 24 hours in duration. The results of the reverse osmosis tests of the control and treated membranes are tabulated in Table IV.

TABLE IV

| Comp. Experiment | Example | Membrane Treatment | RO Tests | | | | | | | | | |
|---|---|---|---|---|---|---|---|---|---|---|---|---|
| | | | 0.2% NaCl at 200 psi | | 0.2% $NaNO_3$ at 200 psi | | 1000 ppm IPA at 200 psi | | $H_2SO_4$, pH 1 at 400 psi | | NaOH, pH 12 at 200 psi | |
| | | | Flux | Solute Passage | Flux | Solute Passage | Flux | Solute Passage | Flux | Solute Passage | Flux | Solute Passage |
| 11 | — | Control | 33 | 2.5 | 36 | 14.8 | 39 | 19 | 36 | 8.4 | 32 | 8.8 |
| | | | 34 | 2.6 | 38 | 15.4 | 41 | 19 | 26 | 8.4 | 33 | 9.0 |
| — | 7 | 0.1% Peracetic Acid | 24 | 1.3 | 27 | 6.8 | 30 | 16 | 26 | 0.8 | 22 | 5.6 |
| | | | 24 | 1.2 | 26 | 5.1 | 28 | 16 | 25 | 0.7 | 21 | 5.4 |
| — | 8 | 0.1% Periodic | 21 | 2.6 | 23 | 10.9 | 28 | 22 | 23 | 5.2 | 19 | 7.4 |

TABLE IV-continued

| | | | RO Tests | | | | | | | | |
|---|---|---|---|---|---|---|---|---|---|---|---|
| | | | 0.2% NaCl at 200 psi | | 0.2% NaNO3 at 200 psi | | 1000 ppm IPA at 200 psi | | H2SO4, pH 1 at 400 psi | | NaOH, pH 12 at 200 psi |
| Comp. Experiment | Example | Membrane Treatment | Flux | Solute Passage | Flux | Solute Passage | Flux | Solute Passage | Flux | Solute Passage | Flux | Solute Passage |
| | | Acid | 22 | 4.1 | 25 | 14.7 | 25 | 26 | 23 | 6.3 | 20 | 8.6 |
| — | 9 | 1000 ppm Chloramine | 24 | 1.7 | 26 | 5.5 | 26 | 27 | 25 | 1.6 | 26 | 8.4 |
| | | | 24 | 2.3 | 27 | 7.2 | 28 | 28 | 26 | 1.8 | 27 | 8.7 |

The water flux of all the membranes is somewhat reduced by the treatments but the solute passage is likewise reduced with the exception of the membranes treated with periodic acid and chloramine, which show increased solute passage for isopropyl alcohol.

EXAMPLES 10–13

A composite crosslinked polyamide membrane intended for use in seawater desalination and available commercially under the designation SW30HR from FilmTec Corporation is evaluated with simulated seawater containing 3.5 percent mixture of sodium chloride and other salts (on an anhydrous basis) at 800 psi. The SW30HR membrane is similar in composition to the FT30 membrane. The composition of the simulated seawater is as follows:

| | Percent by Weight |
|---|---|
| NaCl | 58.49 |
| MgCl2.6H2O | 26.46 |
| NaSO4 | 9.75 |
| CaCl2 | 2.765 |
| KCl | 1.645 |
| NaHCO3 | 0.477 |
| KBr | 0.238 |
| H3BO3 | 0.071 |
| SrCl2.6H2O | 0.095 |
| NaF | 0.007 |

The flux and solute passage of two samples of this membrane are tabulated in Table V as Comparative Experiment 12.

Samples of the SW30HR control are then treated with 0.1 percent aqueous peracetic acid for 24 hours in Example 10. The flux and solute passage of the treated membrane with simulated seawater is tabulated in Table V.

The SW30HR membrane in two samples is treated with 0.1 percent periodic acid for 25 hours. The reverse osmosis test results for these samples are tabulated in Table V as Example 11.

TABLE V

| | | | RO Tests 3.5% SSW at 800 psi | |
|---|---|---|---|---|
| Comparative Example | Example | Treatment | Flux | Solute Passage |
| 12 | — | SW30HR Control | 13 | 0.5 |
| " | | | 14 | 0.5 |
| — | 10 | 0.1% Peracetic Acid, 24 hrs. | 11 | 0.4 |
| " | | | 11 | 0.4 |
| — | 11 | 0.1% Periodic acid, 25 hrs. | 15 | 1.4 |
| " | | | 15 | 1.6 |
| — | 12 | 1000 ppm Chloramine | 25 | 1.0 |
| " | | | 24.2 | 1.7 |
| — | 13 | 1000 ppm Chloramine adjusted to pH 1 | 11 | 0.6 |
| " | | | 10 | 0.6 |

Two samples of the SW30HR membrane are treated with 1000 parts per million chloramine in water for 20 hours in Example 12. The reverse osmosis test results indicated a higher water flux and moderately higher solute passage.

In Example 13, the SW30HR membrane was also treated with 1000 parts per million chloramine but in a solution adjusted to a pH of 1. The water flux of this treated membrane was slightly lower than prior to treatment and the solute passage was marginally increased.

EXAMPLE 14

A commercially available FT30 membrane is coated with 85 percent phosphoric acid and treated at 120° C. as generally described in U.S. Pat. No. 4,765,897. It is then incorporated into spiral wound reverse osmosis elements.

A clean sample of this membrane in spiral element form is treated with 0.3 percent peracetic acid for 16 hours. The resulting membrane element along with an untreated control, is then treated with a tannic acid colloid as described in U.S. Pat. No. 4,765,897. Both membranes were subjected to the following series of tests: (1) tested on 0.2 percent MgSO4 at 70 psi, (2) stored in a biostatic storage solution for 15 days, (3) retested on 0.2 percent MgSO4 at 70 psi, and (4) tested on 0.2 percent H2SO4 at 70 psi. Results appear in Table VI.

TABLE VI

| | | 0.2 Percent MgSO4 at 70 psi | | 0.2 percent MgSO4 Retest* at 70 psi | | 0.2 percent H2SO4 at 70 psi | |
|---|---|---|---|---|---|---|---|
| | Treatment | Flux (gpd) | Percent Rejection | Flux (gpd) | Percent Rejection | Flux (gpd) | Percent Rejection |
| Comparative Experiment 20 | Control | 330 | 98.8 | 281 | 98.1 | 296 | 25.9 |
| Example 31 | 0.3% peracetic acid for 16 | 262 | 99.1 | 228 | 98.4 | 241 | 93.2 |

TABLE VI-continued

|  | 0.2 Percent MgSO$_4$ at 70 psi | | 0.2 percent MgSO$_4$ Retest* at 70 psi | | 0.2 percent H$_2$SO$_4$ at 70 psi | |
| --- | --- | --- | --- | --- | --- | --- |
| Treatment | Flux (gpd) | Percent Rejection | Flux (gpd) | Percent Rejection | Flux (gpd) | Percent Rejection |
| hours followed by tannic acid colloid | | | | | | |

*After storage for 15 days in biostatic solution consisting of 1.0 percent by weight sodium metabisulfite dissolved in 80:20 water:propylene glycol.

What is claimed is:

1. A method of treating a composite crosslinked polyamide reverse osmosis membrane comprising: contacting a composite membrane having a crosslinked polyamide discriminating layer with a solution of an effective amount of a compatible oxidizing reagent, in quality and/or quantity sufficient for providing the membrane with properties for enabling the passage through the membrane of H$_2$SO$_4$ in a 2 percent aqueous solution at 400 psig and 15° to 35° C. to be reduced by at least 30 percent relative to the membrane prior to treatment and the water flux of said membrane to be reduced by not more than 50 percent after treatment.

2. The method as described in claim 1 wherein the polyamide discriminating layer is derived from reactants comprising (a) a compound or polymer bearing at least two primary amine groups and (b) a compound or polymer bearing an average of more than two carboxylic acyl halide groups.

3. The method as described in claim 2 wherein reactant (a) is a phenylenediamine.

4. The method as described in claim 2 wherein (b) is trimesoyl halide, cyclohexane-1,3,5-tricarbonyl halide, mixtures thereof or mixtures of either with isophthaloyl halide or terephthaloyl halide.

5. The method as described in claim 4 wherein (b) comprises at least 50 mole percent trimesoyl halide and (a) is at least 50 mole percent phenylenediamine.

6. The method as described in claim 5 wherein the polyamide discriminating layer is formed by interfacial polymerization of (a) and (b) on a microporous substrate.

7. The method as described in claim 6 wherein (a) comprises at least 50 mole percent m-phenylenediamine.

8. The method as described in claim 7 wherein the substrate is polysulfone.

9. The method as described in claim 8 wherein the membrane is contacted with an aqueous solution of chloramine.

10. The method as described in claim 8 wherein the membrane is contacted with periodic acid.

11. The method as described in claim 8 wherein the membrane is contacted with peracetic acid.

12. The method as described in claim 2 wherein the membrane is contacted with a peroxycarboxylic acid of less than 300 molecular weight, periodic acid, N-chloramine or N-bromoamine.

13. The method as described in claim 12 wherein the membrane is contacted with peracetic acid.

14. A treated composite crosslinked polyamide membrane prepared by a process comprising contacting a crosslinked polyamide discriminating layer of a reverse osmosis composite membrane with a solution of an effective amount of a compatible oxidizing reagent in quality and/or quantity sufficient for providing the membrane with properties for enabling the membrane after treatment to have a water flux of at least 50 percent of the membrane prior to treatment and to enable passage of H$_2$SO$_4$ in a 2 percent aqueous solution at 400 psig and 25° C. to be reduced by at least 30 percent relative to the membrane prior to treatment.

15. The membrane as described in claim 14 wherein the polyamide discriminating layer is derived from reactants comprising (a) a compound or polymer bearing at least two primary amine groups and (b) a compound or polymer bearing an average of more than two carboxylic acid halide groups.

16. The membrane as described in claim 15 wherein (b) is a trimesoyl halide, cyclohexane-1,3,5-tricarbonyl halide, mixtures thereof or mixtures of either with isophthaloyl halide or terephthaloyl halide.

17. The membrane as described in claim 15 wherein (b) comprises at least 50 mole percent trimesoyl halide.

18. The membrane as described in claim 17 wherein the polyamide discriminating layer is formed by interfacial polymerization of (a) and (b) on a microporous substrate.

19. The membrane as described in claim 18 wherein (a) comprises t least 50 mole percent m-phenylenediamine.

20. The membrane as described in claim 19 wherein (a) consists essentially of m-phenylenediamine, (b) consists essentially of trimesoyl chloride, the substrate is made from polysulfone and the membrane to be treated is clean.

21. The membrane as described in claim 20 wherein the compatible oxidizing reagent is peracetic acid.

22. The membrane as described in claim 15 wherein the compatible oxidizing reagent is a peroxycarboxylic acid with a molecular weight of less than 300, periodic acid, N-bromoamine or N-chloramine.

* * * * *